(12) United States Patent
Alsarhan et al.

(10) Patent No.: US 12,478,736 B1
(45) Date of Patent: Nov. 25, 2025

(54) TRIPOD ATTACHMENT FOR SYRINGE

(71) Applicant: KING SAUD UNIVERSITY, Riyadh (SA)

(72) Inventors: Mohammed Abdullah Alsarhan, Riyadh (SA); Lamya Mamoun Khalaf, Riyadh (SA); Rawan Mamoun Khalaf, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/093,633

(22) Filed: Mar. 28, 2025

(51) Int. Cl.
*A61M 5/31* (2006.01)

(52) U.S. Cl.
CPC ......... *A61M 5/31* (2013.01); *A61M 2202/048* (2013.01); *A61M 2209/088* (2013.01)

(58) Field of Classification Search
CPC ........ A61M 5/42; A61M 5/422; A61M 5/425; A61M 5/427; G03B 17/561; A61B 90/10; A61B 2090/101; A61B 2090/103; A61B 90/11; A61B 90/13; A61B 90/14; A61B 90/16; A61B 90/17; A61B 90/18
See application file for complete search history.

(56) References Cited

U.S. PATENT DOCUMENTS

| | | | | |
|---|---|---|---|---|
| 431,721 | A * | 7/1890 | Jacobs | H01K 3/32 292/17 |
| 544,466 | A * | 8/1895 | Fisher | F16M 11/16 248/177.1 |
| 1,674,493 | A * | 6/1928 | Adams | A62C 31/28 248/188.5 |
| 4,270,537 | A | 6/1981 | Romaine | |
| 10,328,214 | B2 | 6/2019 | Carson | |
| 2016/0263310 | A1 * | 9/2016 | Helbig | F16M 11/041 |
| 2018/0338812 | A1 * | 11/2018 | Morey | A61B 17/3403 |

FOREIGN PATENT DOCUMENTS

| | | |
|---|---|---|
| CN | 201324416 Y | 10/2009 |
| CN | 202236706 U | 5/2012 |
| CN | 216703115 U | 6/2022 |
| CN | 116172620 A | 5/2023 |
| JP | 2020-501724 A | 1/2020 |

* cited by examiner

*Primary Examiner* — James D Ponton
*Assistant Examiner* — Hong-Van N Trinh
(74) *Attorney, Agent, or Firm* — Nath, Goldberg & Meyer; Joshua B. Goldberg

(57) ABSTRACT

A tripod attachment for a syringe including a ring-shaped base, a plurality of upright supports pivotably connected to the base, and a flexible loop connected to and encircling the upright supports. Each of the upright supports includes an upright post, a pressure pad at a first end of the upright post, a pivot connector at a second end of the upright post, and a side clasp extending from the post between the pressure pad and the pivot connector. The flexible loop extends through the side clasps to secure the flexible loop to the upright post. The pivot connector pivotably connects the upright post to the base. In an embodiment, the pivot connector includes a pivot ring extending from a second end of the upright post.

7 Claims, 6 Drawing Sheets

TRIPOD ATTACHMENT FOR SYRINGE

BACKGROUND

1. Field

The present disclosure relates to a syringe accessory and, particularly, to a tripod attachment for an anesthesia syringe.

2. Description of the Related Art

Traditionally, administration of anesthetic injections has been difficult due to tissue mobility, restricted visibility, and patient discomfort. These factors can compromise the effectiveness of numbing, increase patient anxiety, and make the procedure more difficult for practitioners. Existing methods typically rely on manual tissue retraction or assistance from a secondary tool, which may not always be convenient or efficient.

Thus, a tripod attachment solving the afore-mentioned problems is desired.

SUMMARY

The present subject matter relates to a tripod attachment for a syringe that is useful in facilitating delivery of medication to a patient by injection. The tripod attachment for a syringe can include a ring-shaped base comprising a generally circular peripheral wall and a central opening extending through the wall, a plurality of upright supports pivotably connected to the base, and a flexible loop connected to and encircling the upright supports. In an embodiment, the tripod attachment can be connected to an anesthesia syringe to improve administration of local anesthesia to a patient by enhancing injection accuracy, reducing patient discomfort, and facilitating tissue retraction during administration.

An embodiment of the tripod attachment for a syringe includes a base having a peripheral wall and an opening defined within the peripheral wall; a plurality of upright supports pivotably connected to the peripheral wall of the base; and a flexible loop connected to and encircling the plurality of upright supports. In an embodiment, the plurality of upright supports comprises three upright supports.

Another embodiment of the tripod attachment for a syringe includes a base including a peripheral wall and an opening defined within the peripheral wall; a plurality of upright supports pivotably connected to the peripheral wall of the base, each of the upright supports comprising an upright post, a pressure pad at a first end of the upright post, and a pivot connector at a second end of the upright post for pivotably connecting the upright post to the peripheral wall of the base; and a flexible loop connected to and encircling the plurality of upright posts.

Another embodiment of a tripod attachment for a syringe includes a base including a peripheral wall and an opening defined within the peripheral wall; three upright supports pivotably connected to the peripheral wall of the base, each of the upright supports comprising an upright post, a pressure pad at a first end of the upright post, and a pivot ring at a second end of the upright post for pivotably connecting the upright post to the peripheral wall of the base; and a flexible loop comprising a spring, the flexible loop being connected to and encircling the upright posts.

These and other features of the present subject matter will become readily apparent upon further review of the following specification.

DETAILED DESCRIPTION OF THE PREFERRED EMBODIMENTS

Figure 1:
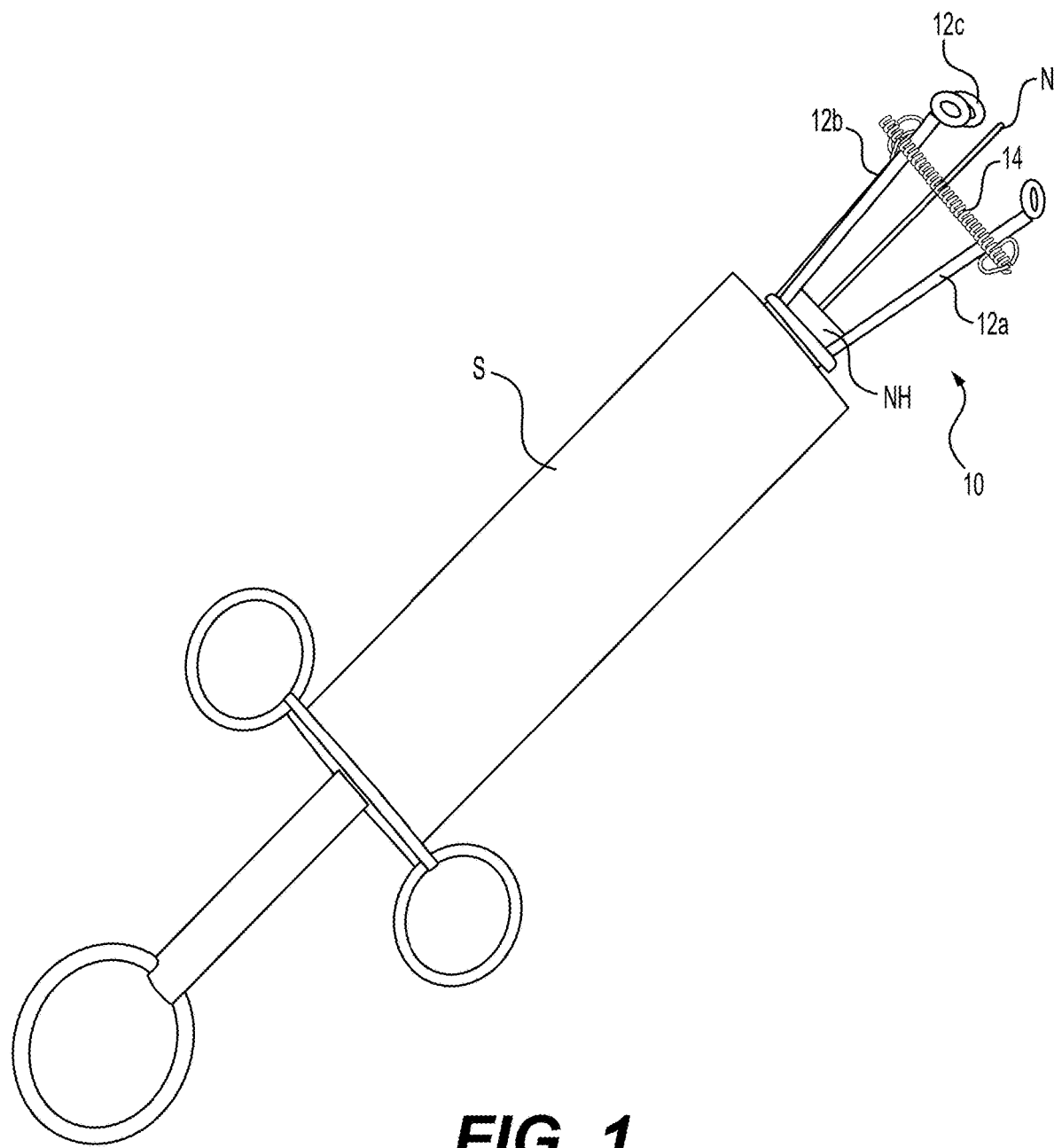
FIG. 1 is a perspective view of the tripod attachment for a syringe attached to a syringe, according to the present teachings.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

A tripod attachment for a syringe is useful in facilitating delivery of medication to a patient by injection. In an embodiment, the tripod attachment can be connected to an anesthesia syringe to improve administration of local anesthesia to a patient by enhancing injection accuracy, reducing patient discomfort, and facilitating tissue retraction during administration.

Figure 2:
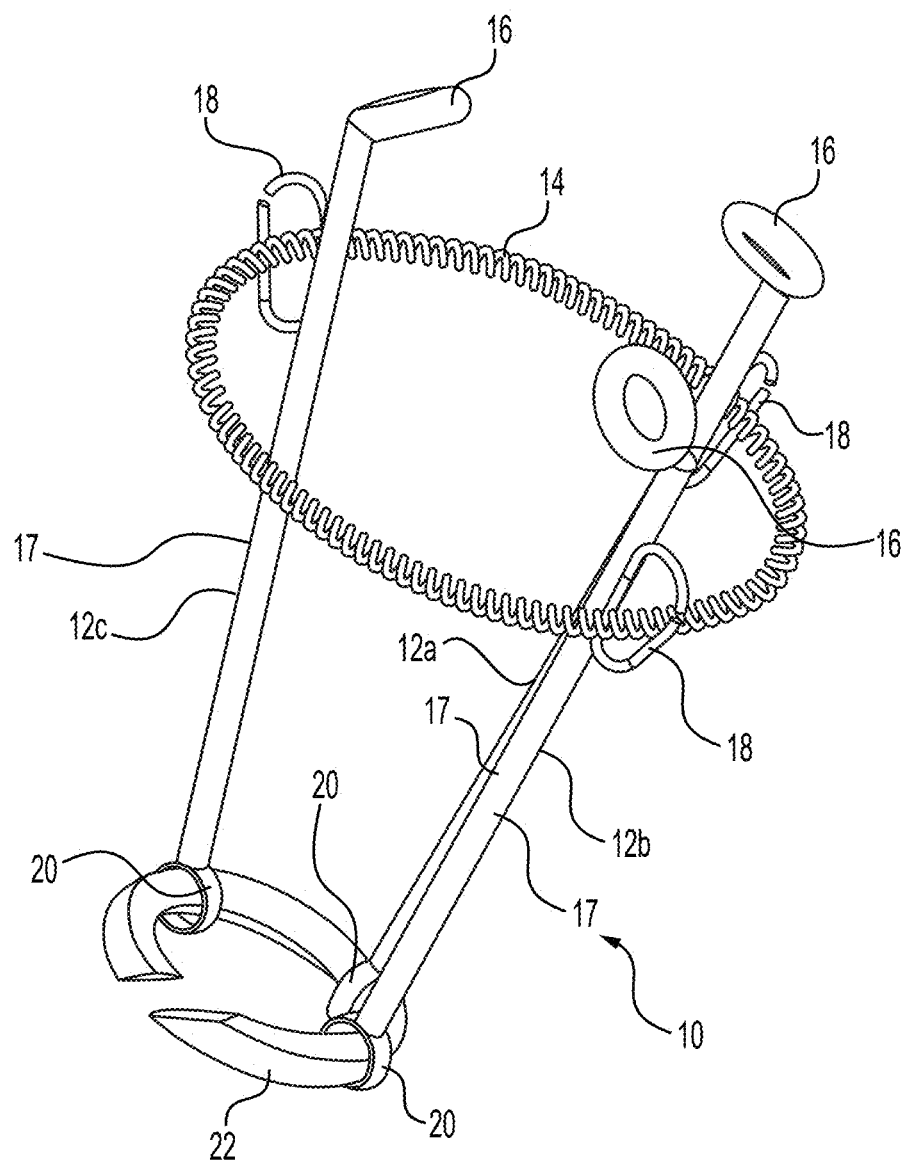
FIG. 2 is a perspective view of the tripod attachment for a syringe according to the present teachings.
Figure 3:
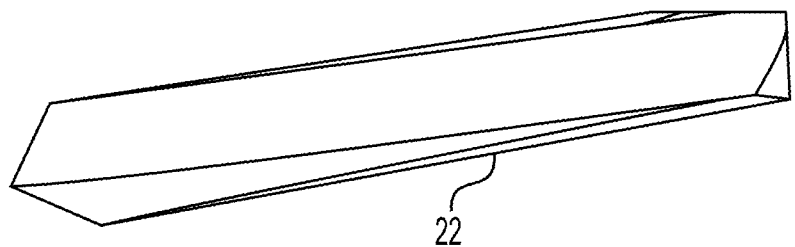
FIG. 3 is an exploded view of a base of the tripod attachment for a syringe shown in FIG. 2.
Figure 4:
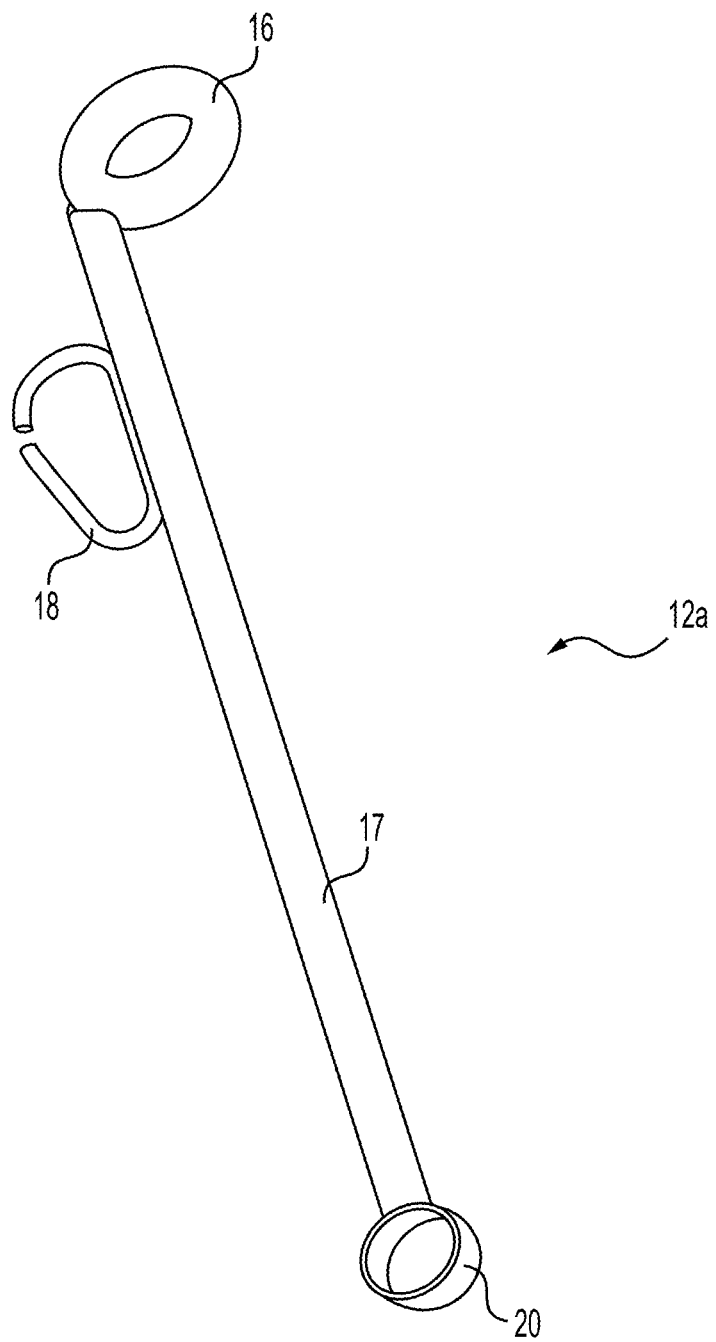
FIG. 4 is an exploded view of a post of the tripod attachment for a syringe shown in FIG. 2.

An embodiment of the tripod attachment for a syringe 10 is shown in FIGS. 1-4. The tripod attachment for a syringe, designated 10 in the drawings, can include a ring-shaped base 22, a plurality of upright supports 12a-12c pivotably connected to the base 22, and a flexible loop 14 connected to and encircling the upright supports 12a-12c (FIG. 2). As shown in FIG. 4, each of the upright supports 12a-12c includes an upright post 17, a pressure pad 16 at a first end of the upright post 17, a pivot connector 20 at a second end of the upright post 17, and a side clasp 18 extending from the post 17 between the pressure pad 16 and the pivot connector 20. The flexible loop 14 can extend through the side clasps 18 to secure the flexible loop 14 to the upright post 17. The pivot connector 20 pivotably connects the upright post 17 to the base 22. In an embodiment, the pivot connector 20 includes a pivot ring extending from a second end of the upright support 17. In an embodiment, the pressure pads 16 can extend at an angle of approximately 45 degrees relative to the upright posts 17.

As shown in FIG. 3, the base 22 can have a non-uniform thickness throughout, resulting in a twisted configuration.

According to an embodiment, the flexible loop 14 can include a spring-like mechanism. In an embodiment, the flexible loop 14 includes a flexible wire or spring.

According to an embodiment, the tripod attachment 10 can be mounted on a syringe S as shown in FIG. 1. The syringe S can include a handle H, a plunger P and finger grips F connected to a syringe barrel B. An injection needle N extends from the needle hub NH and needle N. The base 22 of the tripod attachment 10 can be attached to the needle hub NH such that the base 22 fits tightly around the needle hub H to achieve a friction fit, as shown in FIG. 1.

Once the tripod attachment 10 is attached to the syringe S, pressure pads 16 of the upright supports 12a-12c can extend beyond the free end of the needle N. In an embodiment, the pressure pads 16 can extend about 3 mm beyond the free end of the needle N. The pressure pads 16 can be configured to exert gentle and uniform pressure on the tissue surrounding the injection site. The pressure from the pressure pads 16 can aid in tissue retraction and distraction, optimizing injection accuracy and minimizing patient discomfort. The flexible loop 14 can encircle the upright supports 12a-12c and control the rotational and angular movement of the upright supports 12a-12c facilitated by the pivot connectors 20.

Figure 5:
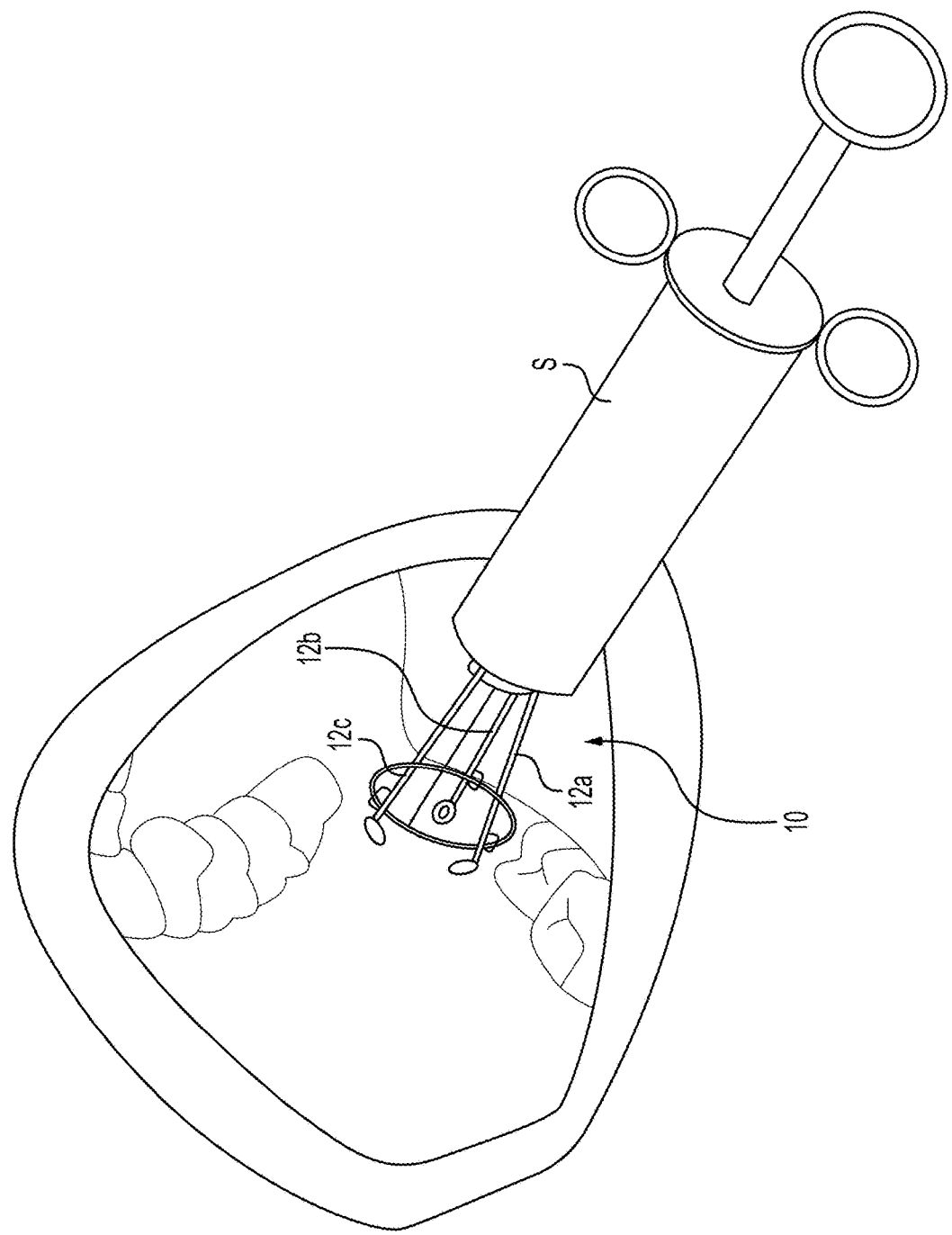
FIG. 5 is an environmental view of the tripod attachment for a syringe attached to a syringe for administering anesthesia to the inferior alveolar nerve block.

FIG. 5 shows the tripod attachment 10 attached to syringe S for administering an injection directed to the inferior alveolar nerve block. As shown, the upright supports 12a-12c are positioned proximate the target injection area such that the needle N is positioned over the target injection area. The upright supports 12a-12c can be moved in a controlled manner until the proper positioning is achieved. The movement of the upright supports 12a-12c is facilitated by the presence of the pivot ring 21, which allows hinge-like movement of the upright supports 12a-12c around the base 20, and the flexible loop 14 which controls the range of movement. Once the proper positioning of the upright supports 12a-12c is achieved, the pressure pads 16 can be pressed against tissue surrounding the target injection area. The pressure pads 16 apply uniform pressure on the surrounding tissue to retract and stabilize the surrounding area. This retraction exposes the injection site more clearly, reducing the risk of soft tissue injury and enhancing the practitioner's visibility and control during anesthetic delivery. Once the tissue is adequately retracted, the needle N is inserted into the targeted area to administer the anesthetic.

Figure 6:
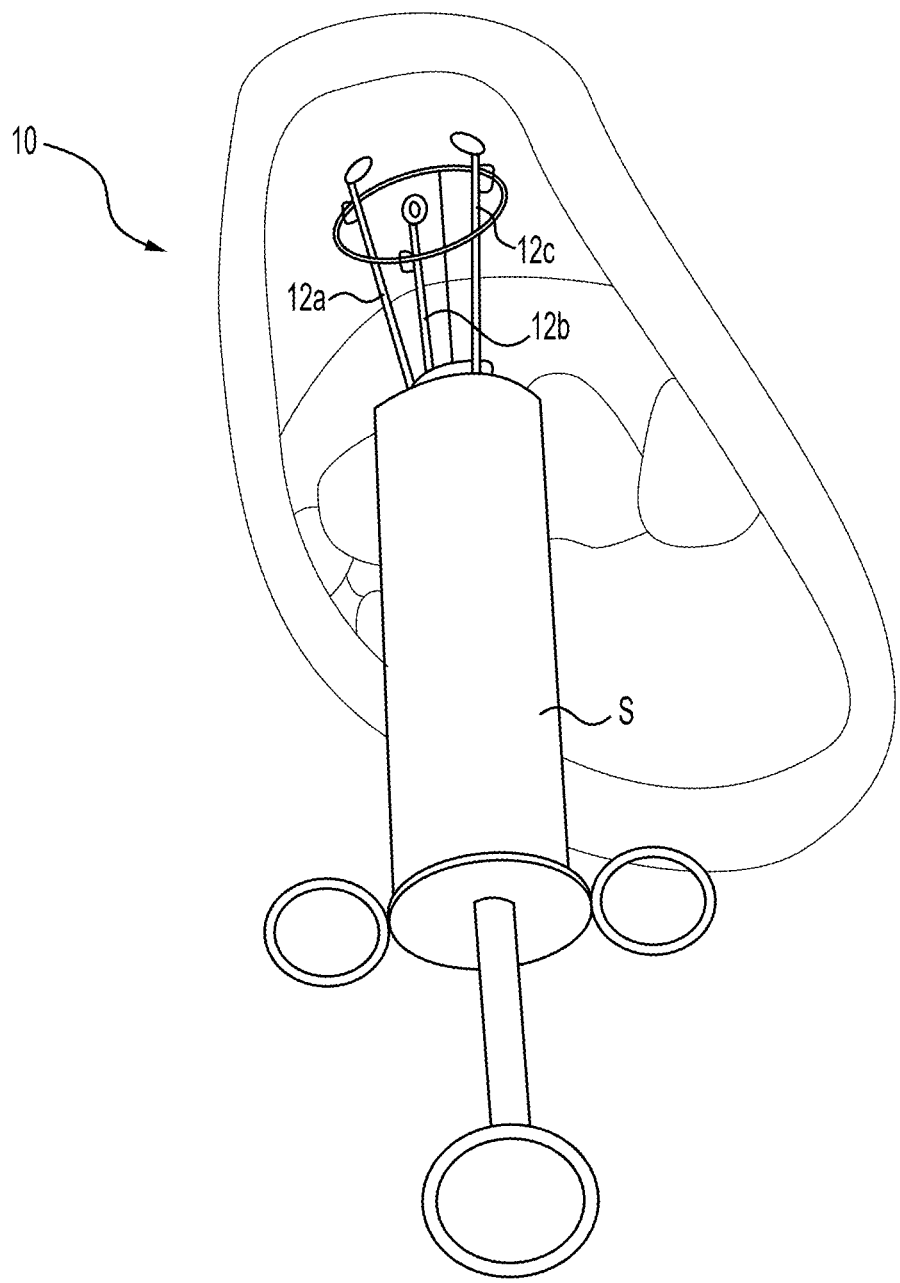
FIG. 6 is an environmental view of the tripod attachment for a syringe attached to a syringe for administering anesthesia to the upper anterior labial area.

FIG. 6 shows the tripod attachment 10 affixed to syringe S for administering an injection directed toward the upper anterior labial area for anesthetic infiltration. As shown, the upright supports 12a-12c are positioned proximate the target injection area such that the needle N is aligned over the upper anterior labial region. The upright supports 12a-12c can be moved in a controlled manner until proper positioning is achieved. This movement is facilitated by the pivot ring 21, which permits hinge-like motion of the upright supports 12a-12c about the base 20, and by the flexible loop 14 which limits the range of movement. Once the desired positioning of the upright supports 12a-12c is attained, the pressure pads 16 are pressed against the tissue surrounding the target injection area. The pressure pads 16 apply uniform pressure to retract and stabilize the surrounding tissue, thereby exposing the injection site more clearly, reducing the risk of soft tissue injury, and enhancing the practitioner's visibility and control during anesthetic delivery. Once the tissue is adequately retracted, the needle N is inserted into the targeted area to administer the anesthetic.

It is to be understood that the tripod attachment for a syringe is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A tripod attachment for a syringe, comprising:
   a base including a peripheral wall having opposing free ends and an opening defined within the peripheral wall;
   a plurality of upright supports pivotably connected to the peripheral wall of the base, each of the upright supports comprising an upright post, a pressure pad at a first end of the upright post, and a pivot ring at a second end of the upright post for pivotably connecting the upright post to the peripheral wall of the base, the peripheral wall of the base extending through each ring; and
   a flexible loop connected to and encircling the plurality of upright posts.

2. The tripod attachment for the syringe of claim 1, wherein the plurality of upright supports comprises three upright supports.

3. The tripod attachment for the syringe of claim 1, wherein each upright post further includes a side clasp extending from a side of the post between the pressure pad and the pivot ring, the flexible loop extending through each side clasp.

4. The tripod attachment for the syringe of claim 1, wherein the flexible loop comprises a spring.

5. The tripod attachment for the syringe of claim 1, wherein each of the pressure pads extend at an angle of approximately 45 degrees to the upright posts.

6. A tripod attachment for a syringe, comprising:
   a base including a peripheral wall having opposing free ends and an opening defined within the peripheral wall;
   three upright supports pivotably connected to the peripheral wall of the base, each of the upright supports comprising an upright post, a pressure pad at a first end of the upright post, and a pivot ring at a second end of the upright post for pivotably connecting the upright post to the peripheral wall of the base, the peripheral wall of the base extending through each ring; and
   a flexible loop comprising a spring, the flexible loop being connected to and encircling the upright posts.

7. The tripod attachment for the syringe of claim 6, wherein each of the pressure pads extend at an angle of approximately 45 degrees relative to the upright posts.

* * * * *